United States Patent
Dange et al.

(10) Patent No.: US 12,072,963 B2
(45) Date of Patent: *Aug. 27, 2024

(54) SYSTEM AND METHOD FOR AFFIXING A SIGNATURE USING BIOMETRIC AUTHENTICATION

(71) Applicant: Amod Ashok Dange, Mountain View, CA (US)

(72) Inventors: Amod Ashok Dange, Mountain View, CA (US); Yash Mody, Mumbai (IN)

(73) Assignee: Amod Ashok Dange, Mountainview, CA (US)

( * ) Notice: Subject to any disclaimer, the term of this patent is extended or adjusted under 35 U.S.C. 154(b) by 460 days.

This patent is subject to a terminal disclaimer.

(21) Appl. No.: 17/481,468

(22) Filed: Sep. 22, 2021

(65) Prior Publication Data

US 2022/0004613 A1 Jan. 6, 2022

Related U.S. Application Data

(63) Continuation-in-part of application No. 17/018,273, filed on Sep. 11, 2020, now Pat. No. 11,582,032.

(Continued)

(51) Int. Cl.
*G06F 21/32* (2013.01)
*G06K 7/14* (2006.01)
(Continued)

(52) U.S. Cl.
CPC ........... *G06F 21/32* (2013.01); *G06K 7/1417* (2013.01); *H04L 9/0866* (2013.01); *H04L 9/30* (2013.01);
(Continued)

(58) Field of Classification Search
CPC ...................... G06F 21/32; G06F 7/588; G06F 2221/2117; G06K 7/1417; H04L 9/0866;
(Continued)

(56) References Cited

U.S. PATENT DOCUMENTS 6,401,206 B1 * 6/2002 Khan ................... H04L 9/3247
713/176
7,013,290 B2 3/2006 Ananian
(Continued)

FOREIGN PATENT DOCUMENTS

JP 4675660 B2 10/2006
JP 2014127164 A 7/2014

OTHER PUBLICATIONS

Notice of Allowance (NOA) issued for U.S. Appl. No. 17/481,465 mailed Feb. 28, 2024 (8 pages).
(Continued)

*Primary Examiner* — Cheng-Feng Huang
(74) *Attorney, Agent, or Firm* — Shumaker, Loop & Kendrick, LLP

(57) ABSTRACT

A system and method for affixing a signature using biometric authentication, is described herein. The system is configured for registering a user by receiving a set of biometric samples of the user, processing the set of biometric samples to compute a Secret-Key (S1) corresponding to the user, generating a Unique-Number (N1) using a random number generation algorithm, applying a Function (F1) to the Secret-Key (S1) and the Unique-Number (N1), to compute a Public-Key (P1), receiving a document signing request from an application. Once the user is registered, the system is configured to receive a biometric sample from the user in real-time and compute the Secret-Key (S2) for authenticating the user. Once the user is authenticated, the system may capture the user's approval to affix the user's signature to the document and transmit the user's signature to the application upon successful authentication of the user.

12 Claims, 6 Drawing Sheets

Related U.S. Application Data

(60) Provisional application No. 63/029,717, filed on May 26, 2020, provisional application No. 62/954,591, filed on Dec. 29, 2019, provisional application No. 62/906,080, filed on Sep. 25, 2019.

(51) Int. Cl.
| | |
|---|---|
| *H04L 9/08* | (2006.01) |
| *H04L 9/30* | (2006.01) |
| *H04L 9/32* | (2006.01) |
| *H04L 9/40* | (2022.01) |
| *G06F 7/58* | (2006.01) |

(52) U.S. Cl.
CPC .......... *H04L 9/3231* (2013.01); *H04L 9/3247* (2013.01); *H04L 63/0861* (2013.01); *G06F 7/588* (2013.01); *G06F 2221/2117* (2013.01); *H04L 63/102* (2013.01)

(58) Field of Classification Search
CPC ....... H04L 9/30; H04L 9/3231; H04L 9/3247; H04L 63/0861; H04L 63/102
See application file for complete search history.

(56) References Cited

U.S. PATENT DOCUMENTS

| | | | |
|---|---|---|---|
| 7,039,805 B1* | 5/2006 | Messing | G06F 21/32 713/176 |
| 7,093,131 B1* | 8/2006 | Kobayashi | H04L 9/3247 380/258 |
| 7,340,438 B2 | 3/2008 | Nordman et al. | |
| 7,496,191 B1 | 2/2009 | Crews et al. | |
| 7,769,633 B2 | 8/2010 | Jokinen et al. | |
| 8,170,615 B2 | 5/2012 | Vanska et al. | |
| 9,633,269 B2 | 4/2017 | Gu et al. | |
| 10,136,191 B1 | 11/2018 | Lewis et al. | |
| 10,489,826 B2 | 11/2019 | Matthews et al. | |
| 10,530,577 B1 | 1/2020 | Pazhoor et al. | |
| 11,252,479 B2 | 2/2022 | Lewis et al. | |
| 2003/0028451 A1 | 2/2003 | Ananian | |
| 2003/0135740 A1* | 7/2003 | Talmor | H04L 9/3231 713/186 |
| 2006/0085844 A1* | 4/2006 | Buer | H04L 9/3263 726/4 |
| 2007/0271463 A1* | 11/2007 | Ginter | H04N 21/25875 713/176 |
| 2008/0072068 A1 | 3/2008 | Wang et al. | |
| 2009/0271634 A1 | 10/2009 | Boult et al. | |
| 2012/0033807 A1* | 2/2012 | Asim | G06F 21/606 380/44 |
| 2014/0006290 A1* | 1/2014 | Hozanne | H04L 9/3231 705/75 |
| 2015/0006895 A1* | 1/2015 | Irvine | G06F 21/6209 713/171 |
| 2015/0046699 A1* | 2/2015 | Benteo | G06F 21/35 713/155 |
| 2015/0095999 A1* | 4/2015 | Toth | H04L 9/3263 726/6 |
| 2015/0134552 A1* | 5/2015 | Engels | G06Q 10/087 705/318 |
| 2015/0269389 A1* | 9/2015 | Lee | H04L 63/0861 726/5 |
| 2015/0280921 A1* | 10/2015 | Geoffrey | H04L 9/3247 713/176 |
| 2016/0050213 A1* | 2/2016 | Storr | H04L 9/32 726/6 |
| 2016/0219046 A1 | 7/2016 | Ballard et al. | |
| 2017/0141920 A1* | 5/2017 | Herder, III | H04L 9/30 |
| 2017/0372059 A1 | 12/2017 | Sindia et al. | |
| 2018/0173871 A1* | 6/2018 | Toth | H04W 12/126 |
| 2018/0307859 A1 | 10/2018 | LaFever et al. | |
| 2019/0097812 A1* | 3/2019 | Toth | H04L 9/0841 |
| 2019/0182176 A1 | 6/2019 | Niewczas | |
| 2019/0306151 A1 | 10/2019 | Hamel et al. | |
| 2020/0204545 A1 | 6/2020 | Pacella et al. | |
| 2020/0266989 A1 | 8/2020 | KrcMarcic-Barackov et al. | |
| 2020/0296093 A1 | 9/2020 | Hoyos | |
| 2021/0058246 A1* | 2/2021 | Stolbikov | H04L 9/0841 |
| 2021/0091937 A1 | 3/2021 | Dange et al. | |
| 2022/0004619 A1 | 1/2022 | Dange et al. | |
| 2022/0004661 A1 | 1/2022 | Dange et al. | |
| 2022/0006815 A1 | 1/2022 | Dange et al. | |

OTHER PUBLICATIONS

Notice of Allowance (NOA) issued for U.S. Appl. No. 17/481,478 mailed Feb. 28, 2024 (11 pages).
Corrected Notice of Allowability issued for U.S. Appl. No. 17/481,478, mailed Mar. 7, 2024 (2 pages).
Non-Final Office Action (NFOA) issued for U.S. Appl. No. 17/481,474 mailed Feb. 26, 2024 (11 pages).
Non-Final Office Action (NFOA) issued for U.S. Appl. No. 17/481,478 mailed Jan. 31, 2024 (11 pages).
Non-Final Office Action (NFOA) issued for U.S. Appl. No. 17/481,465 mailed Feb. 1, 2024 (8 pages).
Non-Final Rejection for U.S. Appl. No. 17/018,273 mailed Jun. 22, 2022 including PTO-892 attached thereto (12 pgs).
Final Rejection for U.S. Appl. No. 17/018,273 mailed Sep. 14, 2022 (15 pages).
Notice of Allowance (NOA) for U.S. Appl. No. 17/018,273 mailed Dec. 5, 2022 (10 pages).
Sy et al. "Generation of Cryptographic Keys from Personal Biometrics: An Illustration Based on Fingerprints." dated Nov. 28, 2021, pp. 1-35.
Hochrieser, "Online Dating Can Benefit From Identity Verification and Biometric Authentication in 2019", Information Security Buzz, dated Jul. 18, 2019 pp. 1-5.
Arsenova, "Face Liveness Detection for Safe Biometric Authentication and Face Recognition", dated Jan. 27, 2020, pp. 1-10.
M. Kapko et al., "What is Windows Hello? Microsoft's biometrics security system explained" dated Jan. 12, 2021, pp. 1-5.
Mjaaland et al., "Biocryptics: Towards Robust Biometric Public/Private Key Generation", The Norwegian Information Security Conference (NISK) dated 2009, pp. 27-42.
Chandra et al., "Generate an Encryption Key by using Biometric Cryptosystems to secure transferring of Data over a Network", IOSR Journal of Computer Engineering (IOSR-JCE), vol. 12, Issue 1, dated May-Jun. 2013), pp. 1-11.
Corrected Notice of Allowance issued for U.S. Appl. No. 17/481,465, mailed Apr. 15, 2024 (6 pages).
Corrected Notice of Allowance issued for U.S. Appl. No. 17/481,465, mailed Mar. 29, 2024 (6 pages).
Corrected Notice of Allowance issued for U.S. Appl. No. 17/481,465, mailed Mar. 13, 2024 (7 pages).
Corrected Notice of Allowance issued for U.S. Appl. No. 17/481,478, mailed Apr. 17, 2024 (4 pages).
Corrected Notice of Allowance issued for U.S. Appl. No. 17/481,478, mailed Mar. 29, 2024 (4 pages).
Notice of Allowance (NOA) issued for U.S. Appl. No. 17/481,474, mailed May 16, 2024 (11 pages).

* cited by examiner

SYSTEM AND METHOD FOR AFFIXING A SIGNATURE USING BIOMETRIC AUTHENTICATION

CROSS-REFERENCE TO RELATED APPLICATIONS AND PRIORITY

The present application is a Continuation in Parts (CIP) application of U.S. Complete application Ser. No. 17/018,273 filed on Sep. 11, 2020 entitled "System and method for sharing user preferences without having the user reveal their identity", which claims priority from U.S. Provisional Application No. 62/906,080 filed on Sep. 25, 2019 entitled "Method and system of managing personal and business information", the U.S. Provisional Application No. 62/954,591 filed on Dec. 29, 2019 entitled "Method and system for anonymously matching consumers and businesses", and also claims priority from U.S. Provisional Application No. 63/029,717 filed on May 26, 2020 entitled "Method and system of storing identity and signature using the human body as a node."

TECHNICAL FIELD

The present subject matter described herein, in general, relates to a system and a method for affixing a signature. More specifically, the present subject matter discloses the system and method for affixing a signature using biometric authentication.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Traditionally, software applications require people to provide their identity as well as personal information in order to receive personalized services. However, this practice has resulted in several undesirable outcomes. People end up creating a different profile for each application such as Gmail™, Twitter™, Amazon™ etc. As the number of profiles increases, it becomes difficult to manage these profiles. On an average an online user has 7.6 social media accounts. Many of these online profiles are created using fake identities. An estimated 30% of profiles on social media are based on fake identities. Moreover, in the existing social networking platforms, there is no barrier to keep a user from creating a profile that corresponds to someone other than themselves. Furthermore, users don't always have control over their online profile's visibility to others within or outside of their own human network. User privacy is also at risk as different applications have different privacy standards.

Additionally, software applications often collect more personal information from users than is needed to provide the application's functionality. This information may be misused by these software applications for targeted advertising. Generally, the information captured by these software applications is used to run advertising campaigns targeted at social media audience cohorts whose attributes are extrapolated from their online activity. This may include the web searches they perform, the content they consume, and the social media posts they engage with. This method poses several limitations. The search and social media platforms that track users' activity often have access to users' identity. Although social media platforms mask their users' identity from advertisers and developers, there is a massive burden on the social media platforms to protect their users' identity and keep it hidden from advertisers and developers at all times. More importantly, users' identity is not hidden from the platforms themselves, thereby creating an exception for the platforms in respect of the rule applied to the advertisers that no single entity should have access to people's identity as well as activity.

Furthermore, ecommerce businesses such as Amazon™ and eBay™ capture users' activity data on one product platform and apply it to other products using shared cookies. Users often have no visibility into which businesses have access to what part of their personal information. The collection of users' attributes and preferences is a one-way flow. Platforms gather users' activity data and retain it permanently. Users have no control over their own activity data once it has been captured by the platform. Moreover, users do not use platforms with the intention of providing the platforms with their personal information. Therefore, finding themselves to be the target of advertisements based on specific personal attributes detected by platforms makes them feel violated. Platforms algorithmically interpret people's engagement data to deduce their attributes and preferences. Hence, there is a level of abstraction between users' actual attributes and preferences, and those targeted by businesses in their advertising campaigns on platforms.

Also, there is an inherent limit to how deeply businesses can understand a user's real attributes and preferences. Users do not know how much of their personal information and preferences that they did not share with anyone intentionally is stored and shared by platforms. This causes widespread anxiety and stress among people. Conversely, in the absence of users' activity on social media platforms, there is insufficient data to extrapolate their attributes and preferences. People's attributes and preferences also change over time. Their activity on various platforms may not reflect all the changes. Businesses may continue to target users in their advertisements even if they no longer have the attributes they are being targeted for.

Furthermore, users' identities on the interne are stored on a network server. The server requires resources to host users' identities, keep them secure, and perform regular maintenance. Users do not always have control over their digital identity stored on the server. Every identity on the server does not necessarily correspond to a unique person. In the existing art there is no known way to prevent the storage of identities. People need to manage credentials to access their own identities on the servers.

To address some of the above issues and to manage credentials of a multitude of applications, Single Sign-On mechanisms such as OAUTH and SAML are used. The Single Sign-on mechanism allows applications to use tokens and transfer the burden of authentication to federated identity providers such as Google™ and Apple™. During the handoff from a third-party authentication to the client application, typically, personally identifiable information such as name, email, profile photo, etc., is also shared with the client application in an opt-out manner. This reintroduces vulnerabilities in the client application and negates the separation of identity authentication in the first place. Even if no personally identifiable information is handed off to the client application, the third-party authentication system is still susceptible to the same security challenges and all weaknesses are passed on downstream.

Another technique adopted for security is two-factor authentication. There are several ways by which two-factor authentication can be enabled in order to provide an additional layer of security. One method is by sending a code over email or text message. This assumes that the client application has access to the user's email or phone number which, if true, also means that they have the ability to determine the user's identity with relative ease. Additionally, if the user's phone or email are compromised, this system works in favor of the perpetrator and further injures the victim. Another method of two-factor authentication is enabled by generating a code via a separate authentication application. It assumes that the user has control over that authentication application. If the user loses access to the authenticator application, they lose access to their identity manager. Yet another method of two-factor authentication is enabled by having the user remember a pass-phrase, a visual shape, or answers that they made up for a number of personal questions, or any variant thereof. This usually results in an unreasonable barrier for the user and a bad user experience.

Existing methods of affixing digital signatures use, as a mechanism of authenticating the user's identity, the user's email, phone number, or merely the user's name hand-drawn by the user. Email and phone number are both external to the user and not permanently under the user's control. As for the hand-drawn name, it is not at all accurately reproducible, and has no original source against which it can be verified.

Thus, there is a long-felt need for affixing a signature using biometric authentication.

SUMMARY

This summary is provided to introduce concepts related to a system and a method for affixing a signature using biometric authentication, and the concepts are further described below in the detailed description. This summary is not intended to identify essential features of the claimed subject matter nor is it intended for use in determining or limiting the scope of the claimed subject matter.

In one implementation, a system for affixing a signature using biometric authentication, is illustrated in accordance with an embodiment of the invention. The system comprises a processor and a memory coupled to the process. The processor is configured to execute program instructions stored in the memory for registering a user. For the purpose of registering the user, the processor may execute program instructions stored in the memory to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), store the Unique-Number (N1) on a user device and in a data repository, store the Public-Key (P1) on a storage device, receive a document signing request from an application, wherein the document signing request corresponds to a document to be signed. Once the user is registered, each time the user makes a request to access the system and sign a document, the processor may execute program instructions stored in the memory to initiate a first authentication process for authenticating the user. For the purpose of first authentication process, the processor may execute program instructions stored in the memory to receive a biometric sample captured from the user in real-time, process the biometric sample to generate a Secret-Key (S2), fetch the Public-Key (P1) corresponding to the user from the user device, and compute a Real-Time-Unique-Number (N2) using the Public-Key (P1), the Secret-Key (S2) and the Function (F1). Based on the comparison of the Real-Time-Unique-Number (N2) with the Unique-Number (N1) stored on the user device, the user is authenticated. Furthermore, after a successful first authentication process, the processor is configured for displaying contents of the document to be signed by the user upon successful first authentication of the user, capturing the user's approval to affix the user's signature to the document, initiating a second authentication process, and transmitting the user's signature to the application upon successful first authentication and second authentication of the user.

In another implementation, affixing a signature using biometric authentication, is illustrated in accordance with an embodiment of the invention. The method may comprise one or more steps for registering a user. For the purpose of registering the user, a processor may execute program instructions stored in a memory to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), store the Unique-Number (N1) on a user device and in a data repository, store the Public-Key (P1) on a storage device, and receive a document signing request from an application, wherein the document signing request corresponds to a document to be signed. Once the user is registered, each time the user makes a request to access the system and sign a document, the processor may execute program instructions stored in the memory to initiate a first authentication process for authenticating the user. For the purpose of the first authentication process, the processor may execute program instructions stored in the memory to receive a biometric sample captured from the user in real-time, process the biometric sample to generate a Secret-Key (S2), fetch the Public-Key (P1) corresponding to the user from the user device, and compute a Real-Time-Unique-Number (N2) using the Public-Key (P1), the Secret-Key (S2) and the Function (F1). Based on the comparison of the Real-Time-Unique-Number (N2) with the Unique-Number (N1) stored on the user device, the user is authenticated. Furthermore, after a successful first authentication process, the processor is configured for displaying contents of the document to be signed by the user upon successful first authentication of the user, capturing the user's approval to affix the user's signature to the document, initiating a second authentication process, and transmitting the user's signature to the application upon successful first authentication and second authentication of the user.

BRIEF DESCRIPTION OF DRAWINGS

The detailed description is described with reference to the accompanying Figures. The same numbers are used throughout the drawings to refer to features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
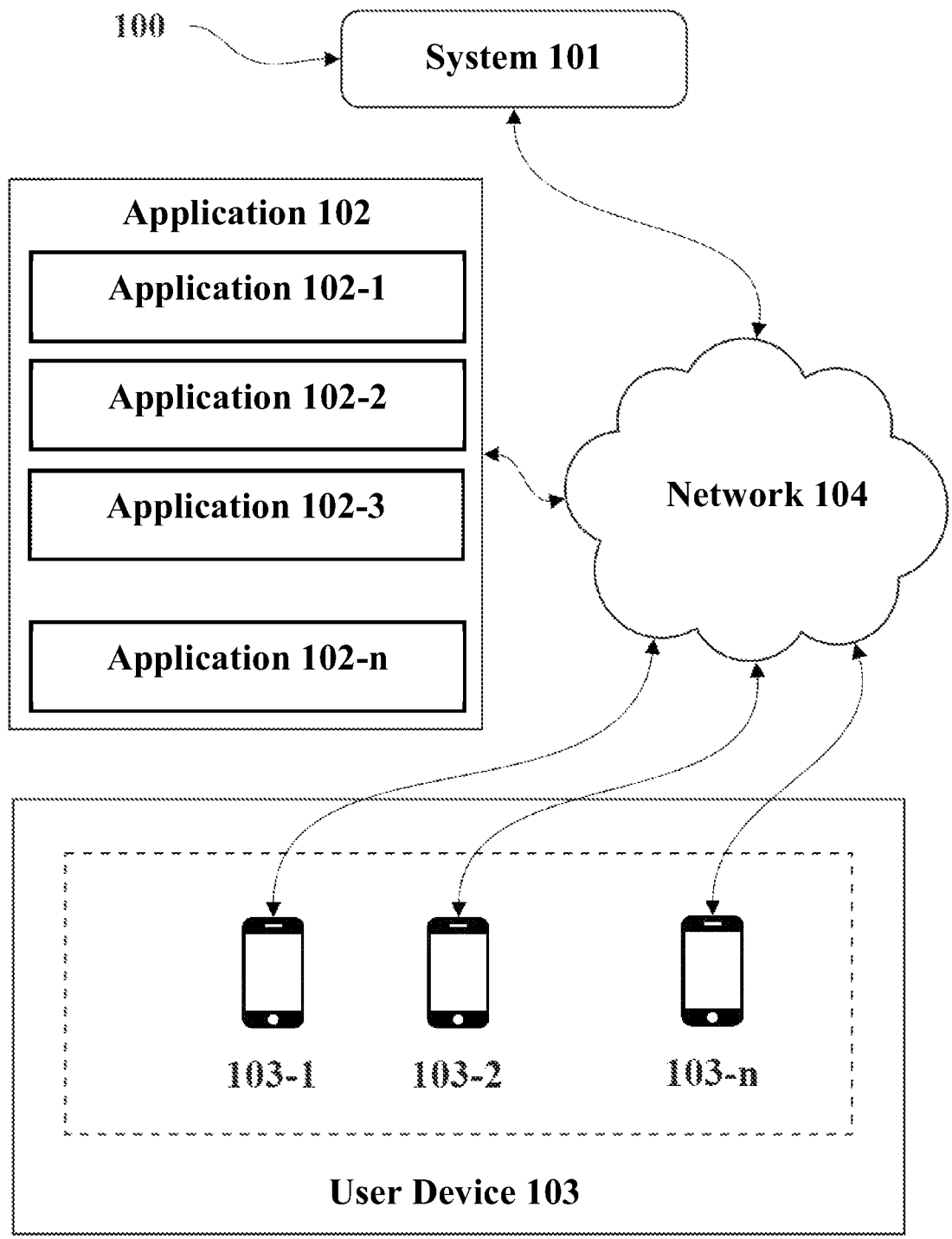
FIG. 1 illustrates a network implementation 100 of a system 101 for affixing a signature using biometric authentication, in accordance with an embodiment of the present disclosure.

Referring to FIG. 1, implementation 100 of system 101 for affixing a signature using biometric authentication is illustrated, in accordance with an embodiment of the present subject matter. In one embodiment, the system 101 may comprise a processor and a memory. Further, the system 101 may be connected to user devices and Applications through a network 104. It may be understood that the system 101 may be communicatively coupled with multiple users through one or more User devices 103-1, 103-2, 103-3 . . . , 103-n and Applications 102-1, 102-2, 102-3 . . . , 102-n collectively referred to as a user device 103 and Applications 102.

In one embodiment, the network 104 may be a cellular communication network used by user devices 103 such as mobile phones, tablets, or a virtual device. In one embodiment, the cellular communication network may be the Internet. The user device 103 may be any electronic device, communication device, image capturing device, machine, software, automated computer program, a robot or a combination thereof. Further the Application 102 may be any networking platform, media platform, messaging platform, ecommerce platform, or any other application platform. The system 101 may be configured to register users over the system 101. Further, the system may be configured to authenticate the user, each time the user makes a request to access the system 101.

In one embodiment, the user devices 103 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The aforementioned user devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the user devices 103 are enabled with biometric scanning capabilities.

In one embodiment, the Application 102 may be a networking platform, an ecommerce platform, or any other internet-based software application which requires user authentication before providing the user with access to the application. The user registration process is further illustrated with the block diagram in FIG. 2.

Figure 2:
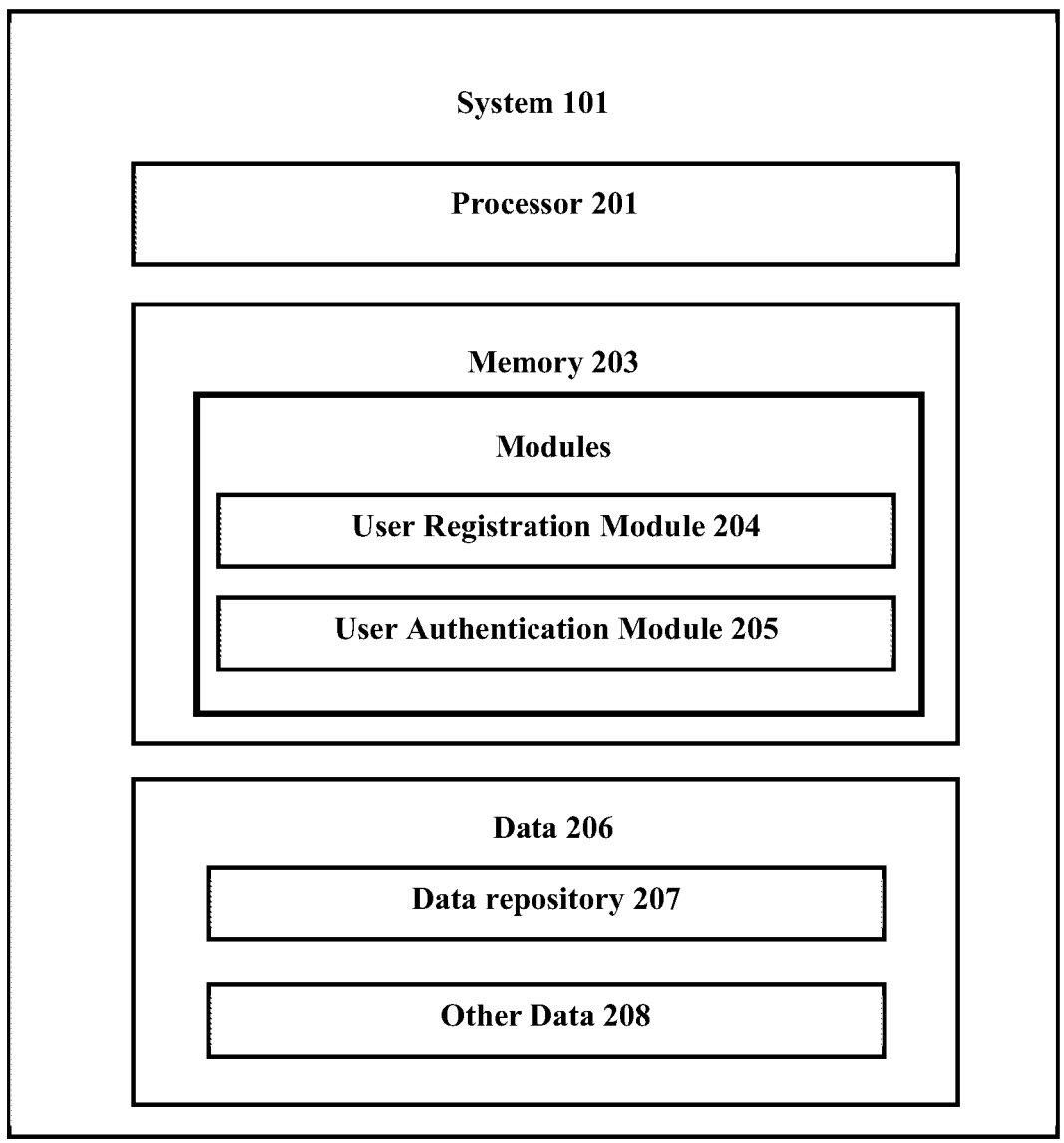
FIG. 2 illustrates components of the system 101 for affixing the signature using biometric authentication, in accordance with an embodiment of the present disclosure.

Referring now to FIG. 2, various components of the system 101 are illustrated, in accordance with an embodiment of the present subject matter. As shown, the system 101 may include at least one processor 201 and a memory 203. The memory consists of a set of modules. The set of modules may include a user registration module 204, and a user authentication module 205. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards.

In one embodiment, the programmed instructions 205 may include routines, programs, objects, components, data structures, etc., which perform particular tasks, functions, or implement particular abstract data types. The data 206 may comprise a data repository 207, and other data 208. The other data 208 amongst other things, serves as a repository for storing data processed, received, and generated by one or more components and programmed instructions. The working of the system 101 will now be described in detail referring to FIGS. 1 and 2.

In one embodiment, the processor 201 may be configured for executing programmed instructions corresponding to user registration module 204 for registering a user over the system 101. For the purpose of registration, a user may send a request for registration to the system 101 from the user device 103. Once the request is received, the processor 201 may receive a set of biometric samples of the user, corresponding to one or more biometric factors. The one or more biometric factors may correspond to fingerprint, face, voice, retina, and palm vein. It must be understood that the one or more biometric factors are not limited only to fingerprint, face, voice, retina, and palm vein. Any other biometric factors which can uniquely identify a user may be collected from the user. The set of biometric samples may be captured by the user device 103 and sent to the system 101 for registration. Further, the processor 201 is configured to process the set of biometric samples to compute a Secret-Key (S1) corresponding to the user. For the purpose of computing the Secret-Key (S1) a set of unique characteristics of the biometric samples may be determined. These unique characteristics must be reproducible every time the user scans their biometrics. Further, the processor 201 is configured to generate a Unique-Number (N1). The Unique- Number (N1) can be computed using any random number generation algorithm known in the art. The Unique-Number (N1) is a random number generated only once by the random number generation algorithm. Further, the processor 201 is configured to apply a Function (F1) to the Secret-Key (S1) and the Unique-Number (N1) to compute a Public-Key (P1). The Function (F1) may be based on Asymmetric Key Encryption which consumes the Secret-Key (S1) and the Unique-Number (N1) to compute a Public-Key (P1). In alternative embodiments, the Function (F1) may be based on any other encryption technique that is known in the art.

The processor 201 is configured to store the Unique-Number (N1) in a user device and in a data repository. In a similar manner, multiple users may be registered over the system 101. Every time the user makes a request to access the system 101, the Unique-Number (N1) and the Public-Key (P1) is used for authentication. It must be noted that the Secret-Key (S1) is not stored on the user device 103 or the system 101. Rather, at the time of authentication, a Secret-Key is computed in real-time.

Furthermore, the processor 201 is configured to receive a document signing request from the Application 102. The document signing request corresponds to a document such as Terms and Conditions, Data privacy or any other document which requires signature of the user. The processor 201 is configured to record the user's signature using the biometric authentication process and transmit a confirmation message to the Application 102. The user's signature may represent a promise to abide by the terms and conditions specified in the document associated with the Application 102. In one exemplary embodiment, the Application 102 may be a web-based application or a mobile application. In one embodiment, the document signing request is generated upon scanning a machine-readable code. The machine-readable code may be in the form of a barcode or a QR code. Upon scanning the machine-readable code using the user device 103, the document signing request is received by the processor 201. The document signing request may comprise information such as Web socket ID associated with the Application 102. Upon receipt of the document signing request, the processor 201 is configured to authenticate the user. The authentication process may be performed twice. The first authentication process is performed before displaying contents of the documents to the user, whereas the second authentication process is triggered instantaneously upon capturing the user's approval through the user interface to sign the document. The steps involved in the first authentication process and the second authentication process are stated below.

In one embodiment, for the purpose of authentication, the processor 201 may be configured for executing programmed instructions corresponding to user authentication module 205. Initially the processor 201 may execute programmed instructions stored in the memory for receiving a biometric sample from the user. The biometric sample may be captured from the user in real-time. Further, the processor 201 may execute programmed instructions stored in the memory for processing the biometric sample to generate a Secret-Key (S2). It must be noted that the Secret-Key (S2) will be different from Secret-Key (S1) if the user is not the same person. Further, the processor 201 may execute programmed instructions stored in the memory for fetching the Public-Key (P1) corresponding to the user from the storage device. Further, the processor 201 may execute programmed instructions stored in the memory for computing a Real-Time-Unique-Number (N2) using the Public-Key (P1), the Secret-Key (S2) and the Function (F1). Furthermore, the processor 201 may execute programmed instructions stored in the memory for authenticating the user based on comparison of the Real-Time-Unique-Number (N2) with the Unique-Number (N1) stored on the user device 103. It must be noted that when biometric samples from the same user are captured, the Secret-Key (S2) which is generated in real-time is the same as the Secret-Key (S1) which was used during user registration. As a result, the Real-Time-Unique-Number (N2) generated using the Public-Key (P1), the Secret-Key (S2) and the Function (F1) will be the same as the Unique-Number (N1) stored in the user device or in a data repository. In case false biometrics are provided during authentication, the Secret-Key (S2) generated in real-time will not be the same as the Secret-Key (S1). Due to this, the Real-Time-Unique-Number (N2) will not be equal to the Unique-Number (N1) and the authentication will fail. It must be noted that during the entire authentication process, the only connection established with the user is through biometric scanning. As a result, authentication fraud as well as duplicate account generation is prevented, while keeping the user's identity private, since there is no need for the user to share their phone number, email address, or any other personally identifiable information.

In one embodiment, if the user is successfully authenticated in the first authentication process, the processor 201 may execute programmed instructions stored in the memory for displaying contents of the document to be signed by the user. The contents of the document may be displayed/rendered on the user interface such as a display screen of the user device 103.

Once the document is displayed to the user, the user may click on a command button for capturing the user's approval to affix the user's signature to the document. Upon capturing the user's approval through the user interface, a second authentication process is triggered instantaneously. The steps of the second authentication process are the same as that of the first authentication process. If the user is successfully authenticated in the second authentication process, Further, the processor 201 may execute programmed instructions stored in memory for transmitting the user's signature to the application upon successful authentication, of the user, in the second authentication process.

Figure 3:
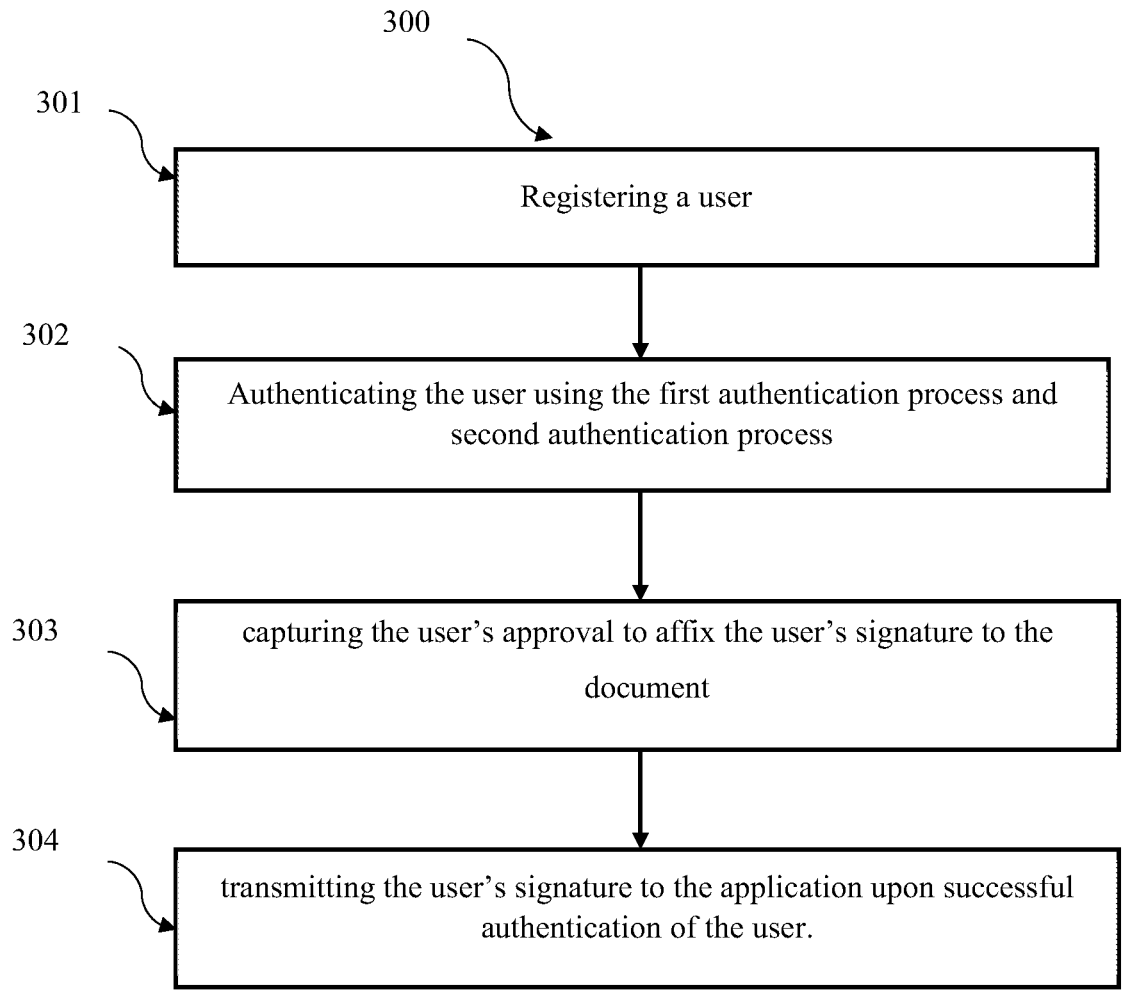
FIG. 3 illustrates a method 300 for affixing the signature using biometric authentication, in accordance with an embodiment of the present disclosure.

Now referring to FIG. 3, a method 300 for affixing the signature using biometric authentication is illustrated, in accordance with an embodiment of the present subject matter.

At step 301, the processor 201 may be configured for registering a user over the system 101. The detailed steps for registering a user over the system 101 are further elaborated with reference to FIG. 4.

At step 302, the processor 201 may be configured for authenticating a user over the system 101 using the first authentication process and second authentication process. The detailed steps for authenticating a user over the system 101 are further elaborated with reference to FIG. 5.

At step 303, the processor 201 may be configured for capturing the user's approval to affix the user's signature to the document.

At step 304, the processor 201 may be configured for transmitting the user's signature to the application upon successful authentication of the user. The process of affixing the signature using biometric authentication is further elaborated with reference to FIG. 6.

Figure 4:
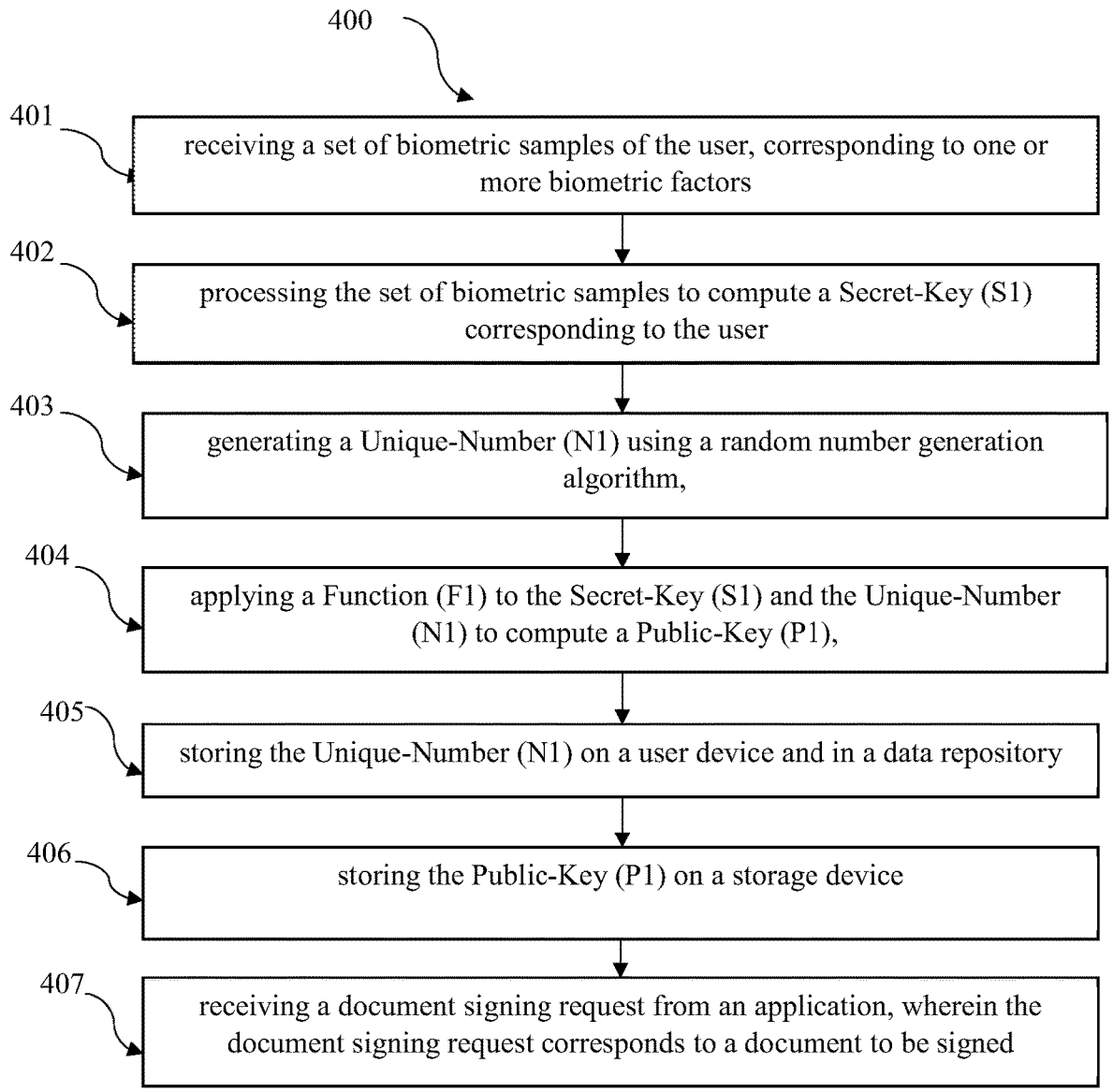
FIG. 4 illustrates a method 400 for user registration, in accordance with an embodiment of the present disclosure.

Now referring to FIG. 4, a method 400 for user registration is illustrated, in accordance with an embodiment of the present subject matter.

At step 401, the processor 201 may be configured for registering a user over the system 101. For the purpose of registration, a user may send a request for registration to the system 101 from the user device 103. Once the request is received, the processor 201 may receive a set of biometric samples of the user, corresponding to one or more biometric factors. The one or more biometric factors may correspond to fingerprint, face, voice, retina, and palm vein.

At step 402, the processor 201 may be configured to process the set of biometric samples to compute a Secret-Key (S1) corresponding to the user. For the purpose of computing the secret key (S1) a set of unique characteristics of the biometric samples may be determined. These unique characteristics must be reproducible every time the user scans their biometrics.

At step 403, the processor 201 may be configured to generate a Unique-Number (N1). The Unique-Number (N1) can be computed using any random number generation algorithm. The Unique-Number (N1) is a random number generated only once by the random number generation algorithm.

At step 404, the processor 201 may be configured to apply a Function (F1) to the Secret-Key (S1) and the Unique-Number (N1) to compute a Public-Key (P1). The Function (F1) may be based on Asymmetric Key Encryption which consumes the Secret-Key (S1) and the Unique-Number (N1) to compute a Public-Key (P1).

At step 405, the processor 201 may be configured to store the Unique-Number (N1) on the user device 103 and in a Data Repository 208.

At step 406, the processor 201 may be configured to store the Public-Key (P1) on a storage device Further, multiple users may be registered over the system 101.

At step 407, once the user registration process is complete, the processor 201 may be configured to receive the document signing request from the application. Every time the user makes a request to access the system 101 or sign a document, the Unique-Number (N1) and the Public-Key (P1) are used for authentication. It must be noted that the Secret-Key (S1) is not stored on the user device 103 or the system 101. Rather, at the time of authentication, the Secret-Key (S2) is computed in real-time. The process for user authentication, upon receipt of the document signing request is stated below with reference to the flow chart of FIG. 5.

Figure 5:
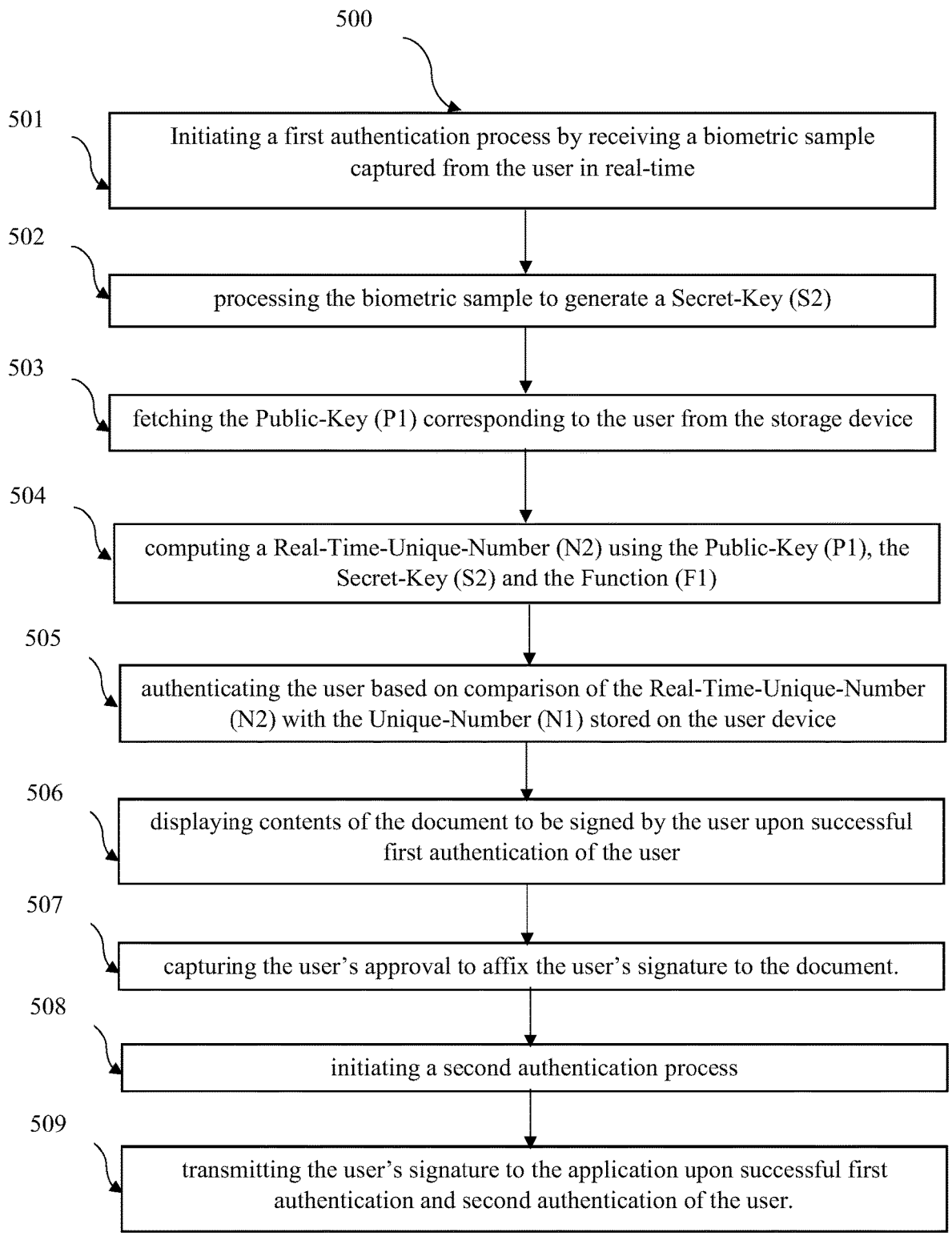
FIG. 5 illustrates a method 500 for user authentication, in accordance with an embodiment of the present disclosure.

Now referring to FIG. 5, a method 300 for user authentication is illustrated, in accordance with an embodiment of the present subject matter. The user authentication may be performed twice. The first user authentication may be performed before rendering the document, to be signed by the user, on a user interface. The second authentication process is triggered instantaneously upon capturing the user's approval to sign the document through the user interface. Although the steps of user approval are performed at different time intervals, it must be noted that the steps performed during both the first authentication process and second authentication process are one and the same.

In one embodiment, if the document contains non-confidential content, the first authentication process may not be required. Such a document is rendered without the first authentication process and the user's approval to sign the document is accepted after the successful second authentication process.

The steps performed during the first and the second authentication process are listed below as steps 501 to 505.

At step 501, the processor 201 may be configured to receive a biometric sample from the user. The biometric sample may be captured from the user in real-time.

At step 502, the processor 201 may be configured to process the biometric sample to generate a Secret-Key (S2). It must be noted that the Secret-Key (S2) will be different from Secret-Key (S1) if the user is not the same person.

At step 503, the processor 201 may be configured to fetch the Public-Key (P1) corresponding to the user from the user device 103.

At step 504, the processor 201 may be configured to compute a Real-Time-Unique-Number (N2) using the Public-Key (P1), the Secret-Key (S2) and the Function (F1).

At step 505, the processor 201 may be configured to authenticate the user based on comparison of the Real-Time-Unique-Number (N2) with the Unique-Number (N1) stored on the user device 103. It must be noted that when biometric samples from the same user are captured, the Secret-Key (S2) generated in real-time is the same as the Secret-Key (S1) that was generated during user registration. As a result, the Real-Time-Unique-Number (N2) generated using the Public-Key (P1), the Secret-Key (S2) and the Function (F1) will be the same as the Unique-Number (N1) stored on the user device 103. In case false biometric samples are provided during authentication, the Secret-Key (S2) generated in real-time will not be the same as the Secret-Key (S1). Due to this, the Real-Time-Unique-Number (N2) will not match the Unique-Number (N1) and the authentication will fail. It must be noted that during the entire authentication process, the only connection established with the user is through biometric scanning. As a result, authentication fraud as well as duplicate account generation is prevented, while keeping the user's identity private, since there is no need for the user to share their phone number, email address, or any other personally identifiable information.

At step 506, if the user is successfully authenticated in the first authentication process, the processor 201 may be configured to execute programmed instructions stored in the memory for displaying contents of the document to be signed by the user. The contents of the document may be rendered on the user interface such as a display screen of the user device 103.

At step 507, once the document is displayed to the user, the user may click on a command button for capturing the user's approval to affix the user's signature to the document.

At step 508, upon capturing the user's approval through the user interface, a second authentication process is triggered instantaneously. The steps of the second authentication process are the same as that of the first authentication process.

At step 509, if the user is successfully authenticated in the second authentication process, the processor 201 may be configured to execute programmed instructions stored in the memory for transmitting the user's signature to the application. The process of affixing the signature using biometric authentication is further elaborated with reference to FIG. 6.

Figure 6:
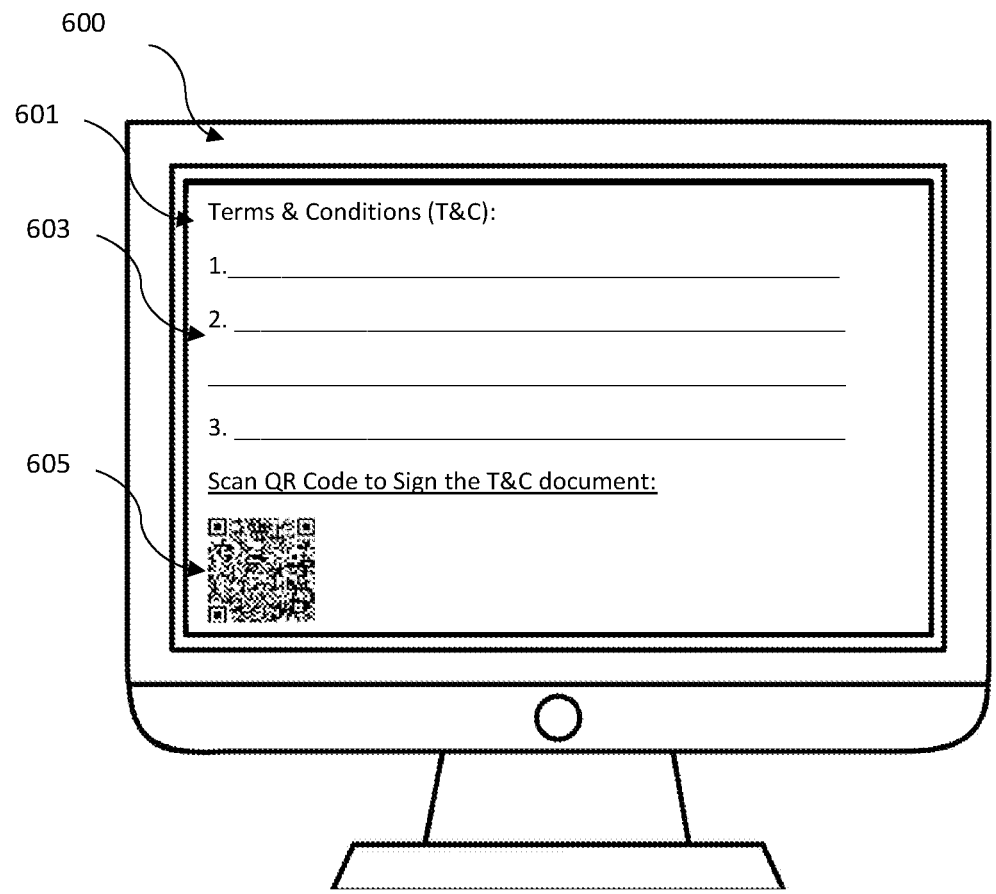
FIG. 6 illustrates a user interface for affixing the signature using biometric authentication, without having the user reveal their identity, in accordance with an embodiment of the present disclosure.

Referring now to FIG. 6, the user interface of an application 102-2 is illustrated. The application 102-2 may be a Social Networking Website. The system 101 may be communicatively coupled to the application 102-2 through the network. When the user attempts to access the terms and conditions page of the Application 102-2, system 101 may initiate a first authentication process. The steps of the first authentication process are as disclosed in method 500. Upon successful authentication of the user in the first authentication process, the user may be allowed to access the Terms and Conditions page 601 of the application 102-2 using the desktop computer 600. The user device 103 may be configured to extract a web socket ID corresponding to the Terms and Conditions page 601 of the application 102-2. The communication of the system 101 with the application 102-2 is enabled using the web socket ID. Upon accessing the Terms and Conditions page 601, the user interface may display a set of Terms and Conditions 603 and a QR code 605. In place of QR code 605, a barcode or any other two-dimensional or three-dimensional code may be displayed. In order to accept the terms and conditions, the user may scan the QR code 605 on the Terms and Conditions page 601 using the user device 103 in order to accept the terms and conditions without revealing their identity to the application 102-2. In other embodiments, the user may click on a command button displayed on the terms and conditions page 601 to accept the terms and conditions. Instead of terms and conditions page 601, a document to be signed by the user may also be rendered on the desktop computer 600. Furthermore, upon capturing the user's approval through the user interface, a second authentication process is triggered instantaneously. The steps of the second authentication process are the same as that of the first authentication process. If the user is authenticated in the second authentication process, the system 101 is configured to use the web socket ID to communicate with the application 102-2, affixing the signature using biometric authentication, and enable the user to access the application 102-2 without providing any personal details to the application 102-2.

Although implementations for the system 101 and the method 300 for affixing a signature using biometric authentication, have been described in language specific to structural features and methods, it must be understood that the claims are not limited to the specific features or methods described. Rather, the specific features and methods are disclosed as examples of implementations for the system 101 and the method 300 for affixing a signature using biometric authentication.

The invention claimed is:

1. A system for affixing a signature using biometric authentication, the system comprising:
 a processor and a memory coupled to the processor, wherein the processor is configured to execute instructions stored in the memory for:
 registering a user by,
   receiving a set of biometric samples of the user, corresponding to one or more biometric factors,
   processing the set of biometric samples to compute a Secret-Key (S1) corresponding to the user,
   generating a Unique-Number (N1) using a random number generation algorithm,
   applying a Function (F1) to the Secret-Key (S1) and the Unique-Number (N1) to compute a Public-Key (P1),
   storing the Unique-Number (N1) on a user device and in a data repository, and
   storing the Public-Key (P1) on a storage device;
 receiving a document signing request from an application, wherein the document signing request corresponds to a document to be signed;
 initiating a first authentication process by,
   receiving a biometric sample captured from the user in real-time,
   processing the biometric sample to generate a Secret-Key (S2),
   fetching the Public-Key (P1) corresponding to the user from the user device,
   computing a Real-Time-Unique-Number (N2) using the Public-Key (P1), the Secret-Key (S2) and the Function (F1), and
   authenticating the user based on comparison of the Real-Time-Unique-Number (N2) with the Unique-Number (N1) stored on the user device;
 displaying contents of the document to be signed by the user upon successful first authentication of the user;
 capturing the user's approval to affix the user's signature to the document;
 initiating a second authentication process; and
 transmitting the user's signature to the application upon successful first authentication and second authentication of the user.

2. The system of claim 1, wherein the one or more biometric factors correspond to fingerprint, face, voice, retina, and palm vein, wherein the set of biometric samples are captured by the user device.

3. The system of claim 1, wherein the application is a web based application or a mobile application.

4. The system of claim 1, wherein the document signing request is generated upon scanning a machine-readable code.

5. The system of claim 4, wherein the application is configured to record the user's signature, wherein the user's signature represents a promise to abide by the terms and conditions specified in the document.

6. The system of claim 1, wherein the second authentication process is triggered instantaneously upon capturing the user's approval through the user interface, wherein the second authentication process is the same as the first authentication process.

7. A method for affixing a signature using biometric authentication, the method comprising steps of:
 registering a user by,
   receiving a set of biometric samples of the user corresponding to one or more biometric factors,
   processing the set of biometric samples to compute a Secret-Key (S1) corresponding to the user,
   generating a Unique-Number (N1) using a random number generation algorithm,
   applying a Function (F1) to the Secret-Key (S1) and the Unique-Number (N1) to compute a Public-Key (P1),
   storing the Unique-Number (N1) on a user device and in a data repository, and
   storing the Public-Key (P1) on a storage device;
 receiving a document signing request from an application, wherein the document signing request corresponds to a document to be signed;
 initiating a first authentication process by,
   receiving a biometric sample captured from the user in real-time,
   processing the biometric sample to generate a Secret-Key (S2),
   fetching the Public-Key (P1) corresponding to the user from the user device,
   computing a Real-Time-Unique-Number (N2) using the Public-Key (P1), the Secret-Key (S2) and the Function (F1), and
   authenticating the user based on comparison of the Real-Time-Unique-Number (N2) with the Unique-Number (N1) stored on the user device;
 displaying contents of the document to be signed by the user upon successful first authentication of the user;
 capturing the user's approval to affix the user's signature to the document;
 initiating a second authentication process; and
 transmitting the user's signature to the application upon successful first authentication and second authentication of the user.

8. The method of claim 7, wherein the one or more biometric factors correspond to fingerprint, face, voice, retina, and palm vein, wherein the set of biometric samples are captured by the user device.

9. The method of claim 7, wherein the application is a web-based application or a mobile application.

10. The method of claim 7, wherein the document signing request is generated upon scanning a machine-readable code.

11. The method of claim 10, wherein the application is configured to record the user's signature, wherein the user's signature represents a promise to abide by the terms and conditions specified in the document.

12. The method of claim 7, wherein the second authentication process is triggered instantaneously upon capturing the user's approval through the user interface, wherein the second authentication process is the same as the first authentication process.

\* \* \* \* \*